United States Patent
Soryal

(10) Patent No.: US 12,431,957 B2
(45) Date of Patent: *Sep. 30, 2025

(54) BASED ON A MODE OF COMMUNICATION, SELECTING A REFLECTIVE SURFACE TO BE USED FOR SIGNAL PROPAGATION

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/764,887

(22) Filed: Jul. 5, 2024

(65) Prior Publication Data
US 2024/0364411 A1    Oct. 31, 2024

Related U.S. Application Data

(63) Continuation of application No. 17/900,675, filed on Aug. 31, 2022, now Pat. No. 12,057,920.

(51) Int. Cl.
*H04L 5/12* (2006.01)
*H04B 7/06* (2006.01)
*H04B 7/145* (2006.01)

(52) U.S. Cl.
CPC .......... *H04B 7/145* (2013.01); *H04B 7/0639* (2013.01)

(58) Field of Classification Search
CPC ............................. H04B 7/145; H04B 7/0639
USPC ................ 375/262, 260, 259, 219, 295, 316
See application file for complete search history.

(56) References Cited

U.S. PATENT DOCUMENTS

| | | | |
|---|---|---|---|
| 11,750,319 B1 * | 9/2023 | Kong | H04K 3/80 455/1 |
| 2023/0258759 A1 * | 8/2023 | Wang | G01S 1/08 455/456.1 |
| 2024/0072881 A1 | 2/2024 | Soryal | |

* cited by examiner

*Primary Examiner* — Zewdu A Kassa
(74) *Attorney, Agent, or Firm* — Guntin & Gust, PLC; Louis Yang

(57) ABSTRACT

The technologies described herein are generally directed to using a reflective surface to reflect a signal from access point equipment to signal receiving equipment in a fifth generation (5G) network or other next generation networks. For example, a method described herein can include receiving a request from access point equipment to establish a communications session between the access point equipment and a user equipment. The method can further include identifying a reflective surface to facilitate a connection between the user equipment and the access point equipment using a mode of communication, resulting in reflected path information corresponding to a reflected path usable by the mode of communication for the communications session. Further, the method can include communicating to the access point equipment, mode information corresponding to the mode of communication and the reflected path information.

20 Claims, 11 Drawing Sheets

BASED ON A MODE OF COMMUNICATION, SELECTING A REFLECTIVE SURFACE TO BE USED FOR SIGNAL PROPAGATION

CROSS REFERENCE TO RELATED APPLICATIONS

This application is a continuation of U.S. patent application Ser. No. 17/900,675 filed on Aug. 31, 2022. All sections of the aforementioned application are incorporated herein by reference in their entirety.

TECHNICAL FIELD

The subject application is related to different approaches to handling communication in networked computer systems and, for example, to using different modes of communication to improve signal propagation.

BACKGROUND

As demands for fast, high-quality wide area network connections have increased, wireless providers have implemented many new technologies, each having advantages and drawbacks over traditional approaches. New, shorter wavelength frequency bands can provide dramatically faster broadband connections to mobile devices, but because these bands can be blocked easier and have narrower beams, positioning them to offer service to user devices has been challenging.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
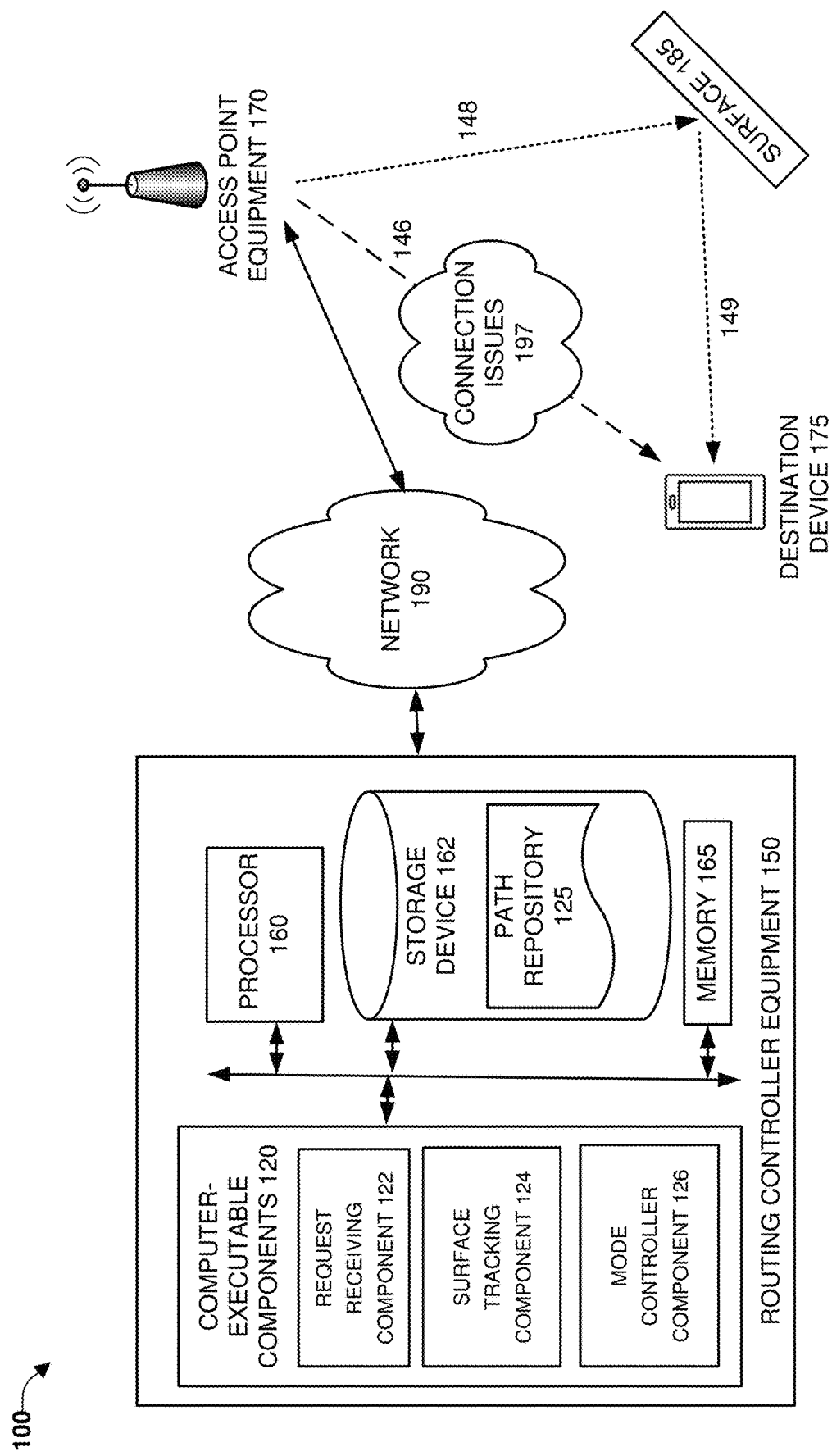
FIG. 1 is an architecture diagram of an example system that can facilitate, based on different modes of communication, using a reflective surface to reflect a signal from access point equipment to signal receiving equipment, with the reflective surface being selected to propagate signals of the mode of communication, in accordance with one or more embodiments.

Generally speaking, one or more embodiments of a system described herein can facilitate, based on different modes of communication, using a reflective surface to reflect a signal from access point equipment to signal receiving equipment, with the reflective surface being selected to propagate signals of the mode of communication, in accordance with one or more embodiments.

In addition, one or more embodiments described herein can be directed towards a multi-connectivity framework that supports the operation of new radio (NR, sometimes referred to as 5G). As will be understood, one or more embodiments can improve network connectivity, by supporting control and mobility functionality on cellular links (e.g., long term evolution (LTE) or NR). One or more embodiments can provide benefits including, system robustness, reduced overhead, and global resource management.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz long term evolution (LTE) bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments, understandable variations of the non-limiting terms "signal propagation source equipment" or simply "propagation equipment," "radio network node" or simply "network node," "radio network device," "network device," and access elements are used herein. These terms may be used interchangeably and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNode B (gNB), cNode B (cNB), network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being in a network with an integrated access backhaul network topology.

In some embodiments, understandable variations of the non-limiting term user equipment (UE) are used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio (NR) systems. The embodiments are however applicable to any radio access technology (RAT) or multi-RAT system where the UEs operate using multiple carriers, e.g., LTE. Some embodiments are described in particular for 5G new radio systems. The embodiments are however applicable to any RAT or multi-RAT system where the UEs operate using multiple carriers, e.g., LTE.

One having skill in the relevant art(s), given the disclosure herein, understands that the computer processing systems, computer-implemented methods, equipment (apparatus) and/or computer program products described herein employ hardware and/or software to solve problems that are highly technical in nature (e.g., rapidly and dynamically utilizing mapped reflective surfaces to direct communication beams), that are not abstract and cannot be performed as a set of mental acts by a human. For example, a human, or even a plurality of humans, cannot efficiently manage the complex reflected paths (which generally cannot be performed manually by a human) with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate using a reflective surface to reflect a signal from access point equipment to signal receiving equipment. Different examples that describe these aspects are included with the description of FIGS. 1-10 below. It should be noted that the subject disclosure may be embodied in many different forms and should not be construed as limited to this example or other examples set forth herein.

FIG. 1 is an architecture diagram of an example system 100 that can facilitate, based on different modes of communication, using a reflective surface to reflect a signal from access point equipment to signal receiving equipment, with the reflective surface being selected to propagate signals of the mode of communication, in accordance with one or more embodiments. For purposes of brevity, description of like elements and/or processes employed in other embodiments is omitted. As depicted, system 100 includes routing controller equipment 150 communicatively coupled to access point equipment 170 via network 190. Access point equipment 170 has a direct signal path 146 to destination device 175, and also, in accordance with one or more embodiments, communicate indirect signal 148 to be reflected off of surface 185 to become reflected signal 149 received by destination device 175.

With respect to reflected signal 149 (as well as other reflected signals discussed herein), one having skill in the relevant art(s), given the description herein, understands that, as used to describe one or more embodiment herein, a reflected beam can be along a path according to which the beam is relayed by the surface to the user equipment at a first angle corresponding to a second angle at which the second signal strikes the surface. Further to this, it is noted that example signal paths shown in various drawings herewith are approximations meant to be used to illustrate different concepts described herein, and are not meant to show particular reflection angles, distances, and other path characteristics.

With respect to the reflectable beam of the previous example, one or more embodiments can combine different signal modes (also termed types or forms of communication/signals herein) to improve the operation of wireless communications networks. Example forms the can be used in accordance with the present disclosure include, but are not limited to propagated beams of radio waves, laser light, sound waves, thermal waves, images for image to digital conversion (described with FIG. 6 below), and other similar beam-based wireless information transfer approaches.

Routing controller equipment 150 can include computer executable components 120, processor 160, storage device 162 and memory 165. Storage device 162 can include surface repository 125. Computer executable components 120 can include request receiving component 122, surface tracking component 124, mode controlling component 126, and other components described or suggested by different embodiments described herein, that can improve the operation of system 100.

Generally speaking, as described herein, access point equipment can be provided useful information regarding surface 185 that can facilitate routing a communications signal via reflection from surface 185 for reasons including routing around connection issues 197. It is appreciated that connection issues 197 can include one or more conditions that affect the transmission of communication beams (e.g., radio waves, light beams, sound waves) along direct signal path 146 from access point equipment to destination device 175.

With respect to all signal receiving equipment described herein, it is appreciated that one or more embodiments can be used to provide replacement or additional signals for different types of communication (e.g., for control signals and/or customer communication signals). One having skill in the relevant art(s), given the description herein, understands how one or more embodiments can beneficially provide additional signal streams to destination devices with multiple input capabilities, e.g., as part of multiple input/multiple output (MIMO) capabilities.

One having skill in the relevant art(s), given the descriptions herein, understands that connection issue 197 conditions can include signals congestion, interference, and blockages. In one or more embodiments, connection issues 197 can also broadly include conditions that can detract from signals being communicated to destination device 175 on a priority basis, e.g., when destination device 175 is designated as being used by first responders, additional communication beams can be used to improve one or more aspects of connections therewith. Further to this point, it should be appreciated that one or more embodiments can use reflected signal 149 as a supplement to otherwise unimpeded direct signal path 146, e.g., providing additional communication signals to destination device 175 as a MIMO device.

Thus, in an example, when quality of a communications session with destination device 175 (e.g., via direct signal path 146) is identified as being below a threshold level of quality (e.g., resulting in a low-quality signal), one or more embodiments can request additional paths based on reflected signals from routing controller equipment 150 to provide alternative or additional (e.g., via MIMO capabilities of destination device 175) signals to improve the quality of the communications session. Additionally or alternatively, one or more embodiments can select from different available signaling modes discussed herein to improve both the number of information streams reaching destination equipment 175 and the quality of the streams, such as, by selecting signaling modes (e.g., using light and sound) that have additional reflection points and are subject to less interference in an environment (e.g., with persistent radio interference).

With respect to the uplink communication capabilities of destination device 175, based on the disclosure herein, it is appreciated that surface repository 125 and surface 185 can also, in one or more embodiments described herein, be used by destination device 175 to communicate uplink signals to access point equipment 170, e.g., to avoid connection issues 197 or to supplement MIMO communications by utilizing both the reverse of direct signal path 146 and the reverse of reflected signal 149. It should be noted that, to facilitate the use of surface 185 for reflection of signals from destination device 175 to access point equipment 170 can utilize capabilities of destination device 175 to transmit signals in a particular direction, e.g., these capabilities being now known or developed in the future.

Continuing the discussion of routing controller equipment 150, it should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, routing controller equipment 150 can further comprise various computer and/or computing-based elements described herein with reference to mobile handset 1000 of FIG. 10, and operating environment 1100 of FIG. 11. For example, one or more of the different functions of network equipment can be divided among various equipment, including, but not limited to, including equipment at a central node global control located on the core Network, e.g., mobile edge computing (MEC), self-organized networks (SON), or RAN intelligent controller (RIC) network equipment.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1106 and FIG. 11. Such examples of memory 165 can be employed to implement any embodiments of the subject disclosure.

According to multiple embodiments, storage device 162 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

As described further herein, storage device 162 is provided as an example storage component for storage of surface information (e.g., for surface 185) including but not limited to, one or more of, the geographic location of surface 185, the absolute orientation (e.g., heading) of surface 185, the relative location of surface 185 relative to access point equipment 170 and/or destination device 175, the relative orientation of surface 185 to access point equipment 170 and/or destination device 175, characteristics of surface 185 (e.g., reflective capability, times when surface is available, limitations on use of surface 185), and whether surface 185 is moving or stationary. One having skill in the relevant art(s), given the description herein, understands additional characteristics that can be stored in surface repository 125 that can affect how surface 185 can provide the different functions described herein, e.g., directing reflected signal 149 to destination device 175. It is also appreciated that storage device 162 is a non-limiting example location for surface repository 125, with other beneficial locations of part or all of this repository being selected based on implementation specific factors, e.g., storage at access point equipment 170 and/or destination device 175.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining request receiving component 122. As discussed with FIGS. 4-5 below, request receiving component 122 can, in accordance with one or more embodiments, receive a request from access point equipment to establish a communications session between the access point equipment and a user equipment.

Further, in another example, in one or more embodiments, computer executable components 120 can include instructions that, when executed by processor 160, can facilitate performance of operations defining surface tracking component 124. As discussed with FIGS. 3-4 below, surface tracking component 124 can, in accordance with one or more embodiments, identifying a reflective surface to facilitate a connection between the user equipment and the access point equipment using a mode of communication of a group of modes of communication, with, in some implementations, this operation resulting in reflected path information corresponding to a reflected path usable by the mode of communication for the communications session.

In yet another example, computer executable components 120 can include instructions that, when executed by processor 160, can facilitate performance of operations defining mode controlling component 126. As discussed herein, in one or more embodiments, mode controlling component 126 can, in response to the request, communicating to the access point equipment, mode information corresponding to the mode of communication and the reflected path information.

Additional factors that can affect the propagation of different signaling modes described by some embodiments herein include, but are not limited to, the transmission strength of the signal, e.g., varying based on factors including the reflective capabilities of surface 185 and the distances of the elements the reflected signal path.

Figure 2:
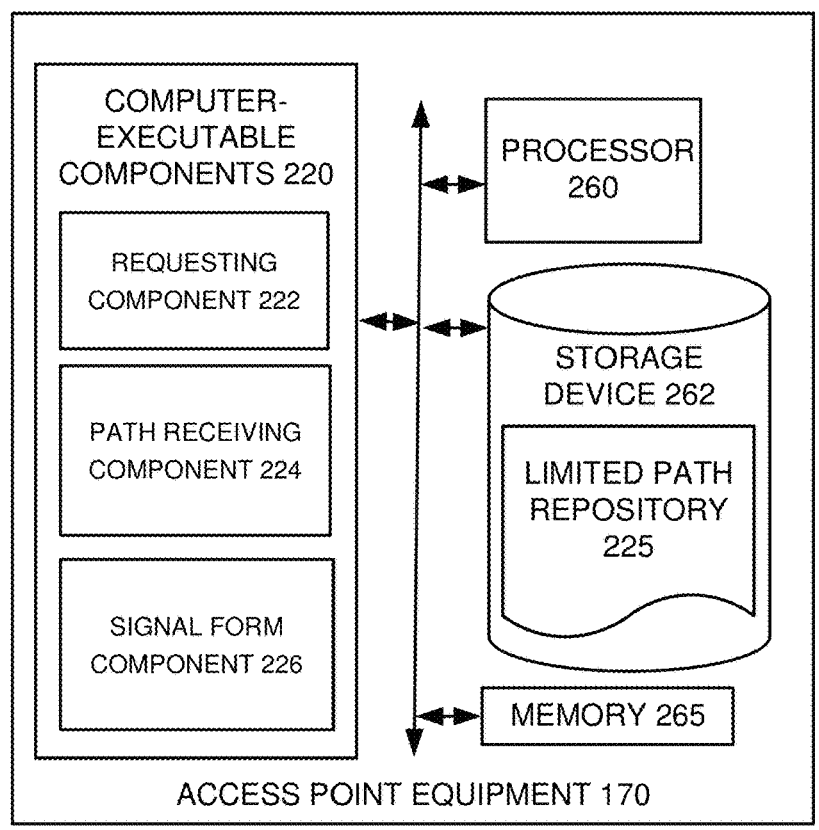
FIG. 2 is a diagram of a non-limiting example system that can facilitate an access point requesting a path and a mode for establishing communications with destination equipment 175, in accordance with one or more embodiments.

FIG. 2 is a diagram of a non-limiting example system 200 that can facilitate an access point requesting a path and a mode for establishing communications with destination equipment 175, in accordance with one or more embodiments. For purposes of brevity, description of like elements and/or processes employed in other embodiments is omitted.

As depicted, system 200 includes are more detailed view of access point equipment 170 of FIG. 1. In one or more embodiments, access point equipment 170 can include storage 262, and memory 265. In one or more embodiments, storage 262 can store limited path repository 225 with a smaller set of paths than path repository 125, e.g., for rapid access to different paths. Similar to memory 165, memory 265 can store one or more computer and/or machine readable, writable, and/or executable components and/or instructions 220 that, when respectively executed by processor 260, can facilitate performance of operations defined by the executable component(s) and/or instruction(s).

In system 200, computer executable components 220 can include requesting component 222, path receiving component 224, signal form component 226, and other components described or suggested by different embodiments described herein that can improve the operation of system 200. For example, in some embodiments, access point equipment 170 can further comprise various computer and/or computing-based elements described herein with reference to mobile handset 1000 of FIG. 10 and operating environment 1100 described with FIG. 11.

For example, in one or more embodiments, computer executable components 220 can be used in connection with implementing one or more of the systems, devices, components, and/or computer-implemented operations shown and described in connection with FIG. 2 or other figures disclosed herein. For example, in one or more embodiments, computer executable components 220 can include instructions that, when executed by processor 260, can facilitate performance of operations defining requesting component 222. As discussed with FIGS. 4-5 below, in one or more embodiments, requesting component 222 can request, from a different network device (e.g., route controller equipment 150), a path for a connection to yet another network device (e.g., destination device 175), with the path including, for example, a form of signal of the connection and a location of a surface usable to alter a direction (e.g., reflect) of the form of signal.

In another example, in one or more embodiments, computer executable components 220 can include instructions that, when executed by processor 260, can facilitate performance of operations defining path receiving component 224. As discussed with FIGS. 4-5 below, path receiving component 224 can, in accordance with one or more embodiments, receive from the routing controller equipment 150, the path to destination device 175.

In another example, in one or more embodiments, computer executable components 220 can include instructions that, when executed by processor 260, can facilitate performance of operations defining signal form component 226. As discussed with FIGS. 4-5 below, can, in accordance with one or more embodiments, facilitate the connection being established with destination device 175 via the path and communicating a signal of the form of signal toward the surface, e.g., by surface 185.

As noted above, one or more embodiments can combine different signaling modes to operate concurrently or individually for connections between access point equipment 170 and designation equipment 175. Examples are provided below of components that can be used to implement the use of different signaling modes by one or more embodiments. It should be noted that the different forms of communication described herein can be used by both access point equipment and destination device 175, e.g., either of this equipment can act as a transmitting device to utilize the transmitters described below to be received by the receivers described below at a receiving device. Different devices that can be used by one or more embodiments can additionally include, wireless communication from front haul to back haul equipment as well as vehicles, routers, and hologram projectors. In one or more embodiments, the components to implement the different forms can be operated concurrently (e.g., for MIMO communication) at the transmitting and receiving equipment.

For example, to utilize thermal waves as a signaling mode, a thermal transmitter can be implanted at a transmitting device, e.g., a small surface of metal can be exposed that changes temperature based on encoding by the digital to thermal conversion. To receive the thermal beam, the receiving device can include a remote thermal sensor that can decode a data stream based on the sensor detecting temperature changes.

Another form of signaling can include an imaging communication system which includes an image transmitter (e.g., a small screen at the transmitting device that can display various images or video based on encoding by digital to image conversion), and an image receiver at the receiving device, e.g., a camera that can detect the rapid image/video changes).

Another form of signaling can include an acoustic communication system which includes a sound beam transmitter (e.g., generating sounds that can be directed in accordance with sound focusing technologies known and to be developed), and a sound receiver that can utilize directed microphone technologies.

Figure 3:
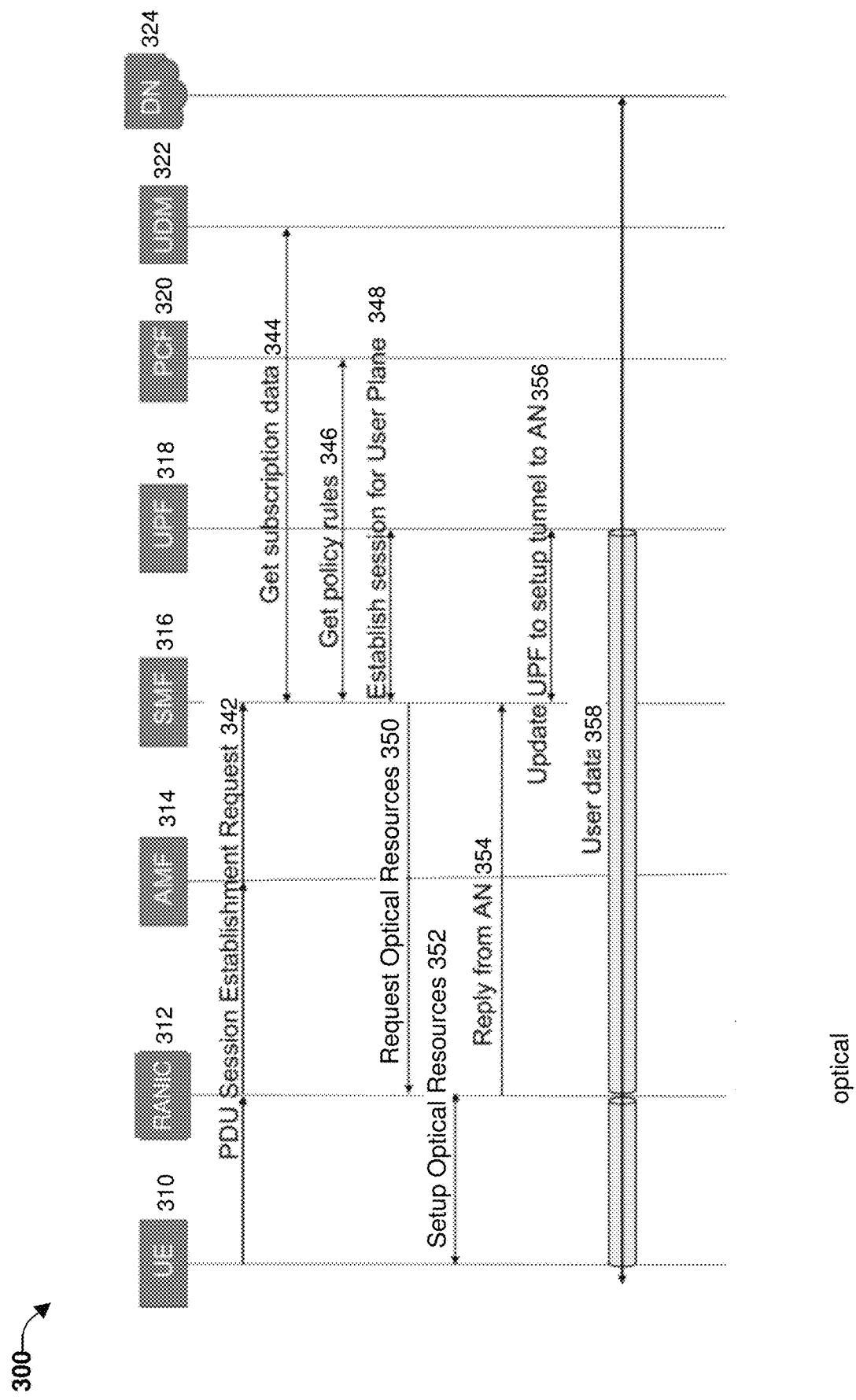
FIG. 3 depicts an example signal diagram that illustrates a process whereby a reflective surface can reflect a signal from access point equipment to signal receiving equipment, in accordance with one or more embodiments.
Figure 4:
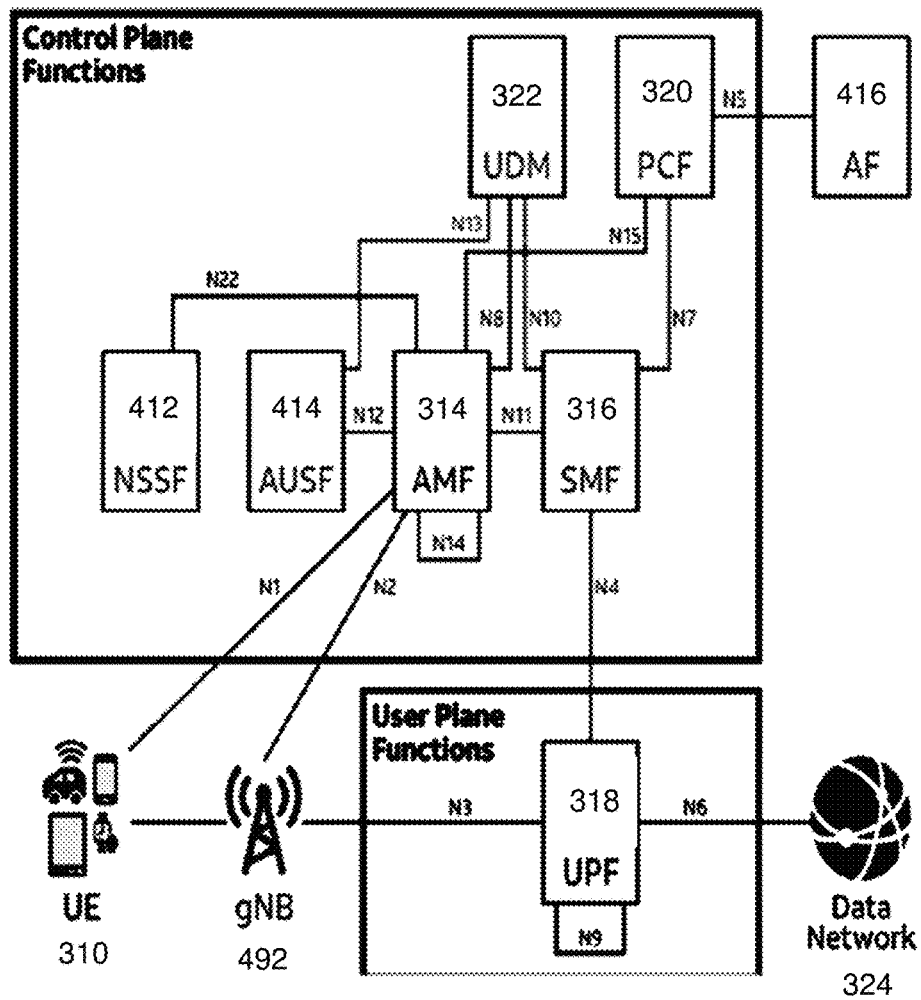
FIG. 4 depicts a non-limiting example architecture diagram can reflect a signal from access point equipment to signal receiving equipment, in accordance with one or more embodiments.
Figure 5:
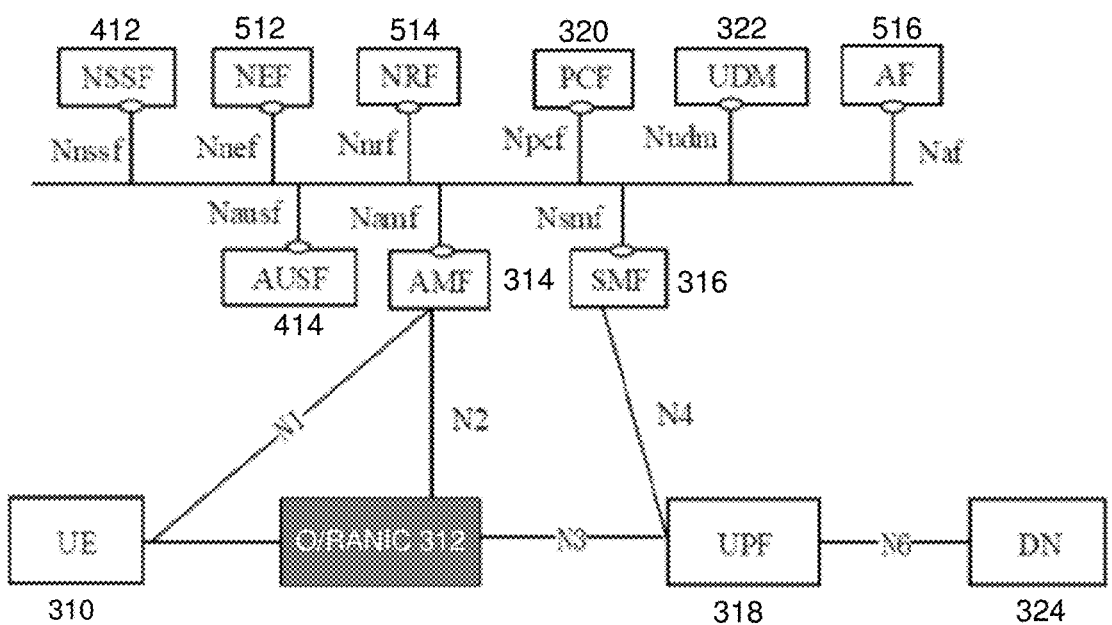
FIG. 5 depicts a non-limiting example architecture diagram can reflect a signal from access point equipment to signal receiving equipment, in accordance with one or more embodiments.

FIGS. 3, 4, and 5 respectively depict an example signal diagram 300, and architecture diagrams 400 and 500 that can facilitate using a reflective surface to reflect a signal from access point equipment to signal receiving equipment, in accordance with one or more embodiments. For purposes of brevity, description of like elements and/or processes employed in other embodiments is omitted. Signal diagram 300 illustrates a non-limiting example sequence of events that illustrates how existing 5G core virtual network functions (VNFs) and elements of the 5G RAN (e.g., gNBs) can be configured to facilitate handshaking for scanning expanded coverage areas enabled by reflective surfaces. It should be noted that, although the example depicted in FIG. 3, the signaling mode is by optical wave, any of the different signaling modes discussed herein can be implemented using similar operations.

Illustrative components of signal diagram 300 include UE 310, O/RANIC 312, access management function (AMF) 314, session management function (SMF) 316, user plane function (UPF) 318, policy control function (PCF) 320, unified data management (UDM) 322, and data network (DN) 324. Non-limiting architecture diagram 400 of FIG. 4 includes some of the above noted components of FIG. 3, as well as network slice selection function (NSSF) 412, authentication server function (AUSF) 414, gNB 492, and application function (AF) 416. Non-limiting architecture diagram 500 of FIG. 5 includes some of the above noted components of FIGS. 3 and 4, as well as network exposure function (NEF) 512, and network repository function (NRF) 514.

At 342, a protocol data unit (PDU) session establishment request is communicated from UE 310 to SMF 316 via AN 312 and AMF 314. To utilize different approaches used by one or more embodiments, with the request by UE 310 can be based on the capabilities of UE 310, e.g., UEs that have optical transceivers can include notice of these capabilities in the request and AMF 314 and PCF 320 can use this information to select from available signal mode resources.

At 344, a get subscription data message is relayed from SMF 316 to UDM 322, via UPF 318 and PCF 320. At 346, a get policy rules message is communicated from SMF 316 to PCF 320, via UPF 318. At 348, SMF 316 establishes with UPF 318, a session for the user plane.

At 350, based on a priority for the communication to UE 310, SMF 316 can request optical resources from O/RANIO/RANIC12 via AMF 314, e.g., additional resources can be dedicated for O/RANIC 312 to locate useful reflective surfaces for the connection. In one or more embodiments, resources allocated to O/RANIC 312 can be adjusted based on different system requirements, e.g., additional signaling mode resources can be more frequently allocated to increase the frequency with which modes are combined. One having skill in the relevant art(s), given the description herein appreciates different types of applications that can require improved performance, e.g., applications with holographic communications, e-gaming, tele-health applications for live diagnostics, etc.

At 352, optical resources can be setup by communication between UE 310 and O/RANIC 312. At 354, O/RANIC 312 responds to the 350 request, e.g., an example response being a notification to core network resources regarding reflective surfaces are identified and can be potentially can be used during the call, even in a situation where UE 310 and/or the surface 250A are mobile. At 356, SMF 316 updates UPF 318 to setup a tunnel to O/RANIC 312. At 358, a user session can be established between UE 310 and UPF 318 via AN 312, AMF 314, SMF 316, and UPF 318.

In an example implementation, a user application can be installed on UE 310 to monitor the applications of UE 310 and, based on the workload and QoS and reliability requirements, the user application can notify a backend server to use UPF 318 to command O/RANIC 312 to dedicate additional system resources to optimizing the use of available signaling modes for better signal coverage. In a variation of this example, the user application can also monitor the communications of UE 310 for excessive packet loss or delay and can trigger the above noted resource allocations based on these conditions.

Figure 6:
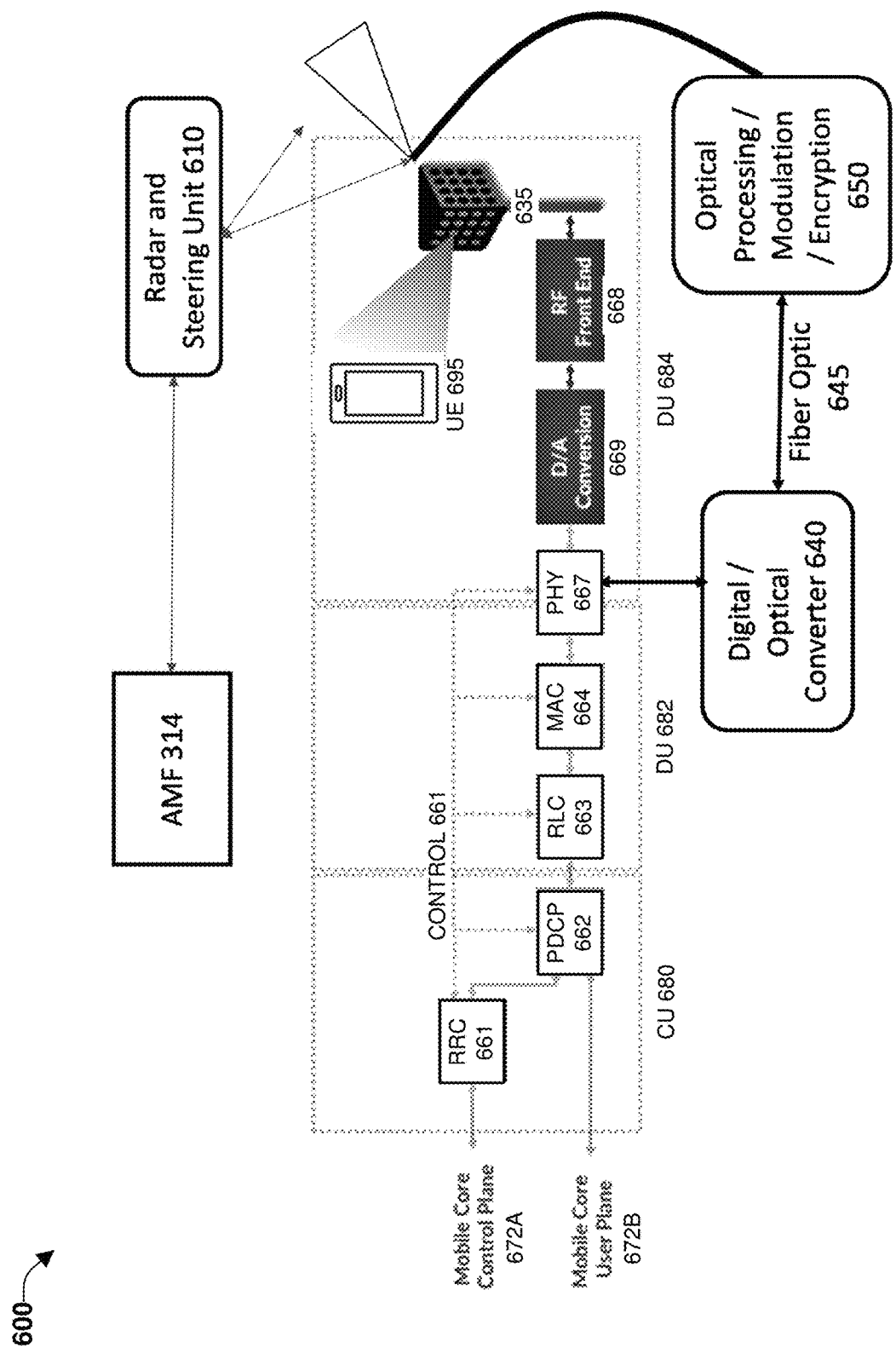
FIG. 6 is a diagram of a non-limiting example scheduler component that can facilitate an access point requesting a path and a mode for establishing communications with destination equipment 175, in accordance with one or more embodiments.

FIG. 6 is a diagram of a non-limiting example scheduler component 600 that can facilitate an access point requesting a path and a mode for establishing communications with destination equipment 175, in accordance with one or more embodiments. For purposes of brevity, description of like elements and/or processes employed in other embodiments is omitted. This figure includes digital scheduling functions in the distributed unit (DU) 682, which includes radio link control layer (RLC) 663, media access control layer (MAC) 664, physical layer (PHY) 667. Centralized unit (CU) 680, which includes packet data convergence protocol layer (PDCP) 662, radio resource control (RRC) 661, with these elements respectively connecting to mobile control planes 672A-B.

Distributed unit 684 encompasses digital/analog conversion 669, radio frequency front-end 668, and signal-mode transceiver 635, e.g., with combinations of the mode transmitters and mode receiver discussed above. Additional components that enable different functions of embodiments include digital/optical converter 640 coupled by fiber optic 645 to optical processing, modulation, and encryption function components 650. Linking FIG. 6 to FIGS. 3-5, AMF 314 provides access management functions to signal-mode transceiver 635.

In alternative embodiments, use of additional modes of communication can be facilitated by components 650. For example, in different embodiments processing, modulation, and encryption functions can be provided for communication using thermal waves, sonic beams, and image encoding, as described with FIG. 2 above.

In one or more embodiments, digital/optical converter 640 can receive a digital traffic flow from 667, convert this flow to an optical signal for processing by optical processing, modulation, and encryption function components 650. Additional functions that can be performed with the optical signal include, but are not limited to, special modulation, multiplexing, and demultiplexing.

In one or more embodiments, functions of scheduler component 600 can be connected to the network core via AMF 314, with this component providing capabilities of the transmitting and receiving components, gNBs and UEs discussed herein. Different device capabilities that can be provided to AMF 314 include, but are not limited to, supported signaling modes, the signaling environment of the devices (e.g., signal saturation, and device movement)

In one or more embodiments, scheduler component 600 can provide instructions to AMF 314 regarding different signaling modes In one or more embodiments, scheduler component 600 can use machine learning approaches to analyze historical data and provide instructions to AMDS 314.

In one or more embodiments, scheduler component 600 can establish new ways to transmit and receive signal paths, enable rapid hopping between signal modes during a single call to improve call quality and allocation of resources, and reduce power consumption while improving communications speed. One having skill in the relevant art(s), given the description herein, appreciates that modern processing power can enable the rapid (e.g., changes made in milliseconds) selection and modification of factors including the surfaces selected for reflection, signals to be aimed, transmission strengths to be selected.

As depicted, scheduler component 600 includes radar and steering unit 610 which can use radar and other sensing equipment to scan the area around receiving equipment before communication via different signal modes. For example, before utilizing modulated lasers to communicate with a UE, one or more embodiments can scan the destination to prevent potential injury by the laser. In addition, radar and steering unit 610 can steer the angle and direction of the mode transceivers to send and receive signals of the different signaling modes. This unit can be connected to the core (e.g., via AMF 314) to retrieve and access location information for destination equipment.

Figure 7:
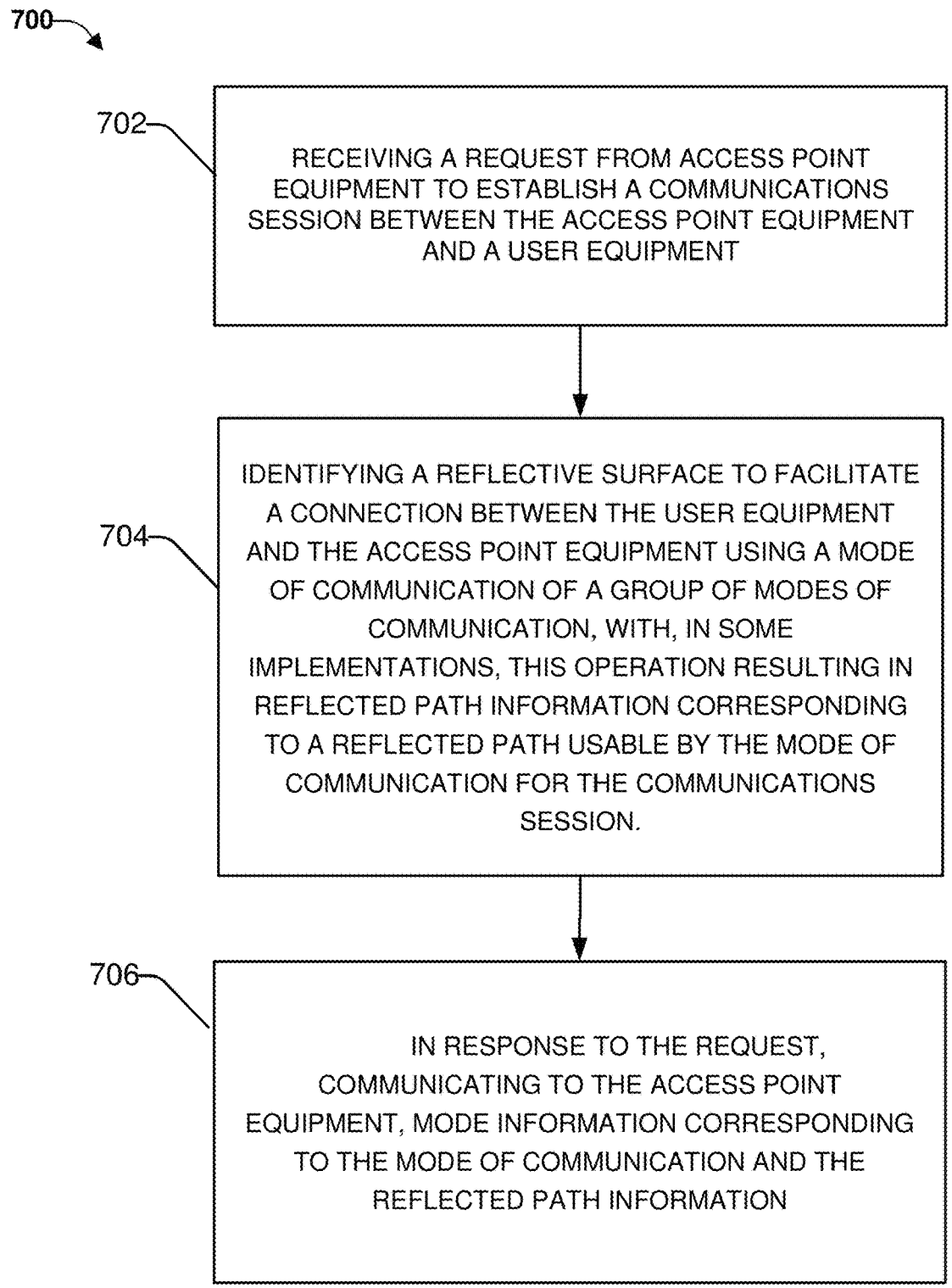
FIG. 7 illustrates an example method that can facilitate, based on different modes of communication, using a reflective surface to reflect a signal from access point equipment to signal receiving equipment, with the reflective surface being selected to propagate signals of the mode of communication, in accordance with one or more embodiments.

FIG. 7 illustrates an example method 700 that can facilitate, based on different modes of communication, using a reflective surface to reflect a signal from access point equipment to signal receiving equipment, with the reflective surface being selected to propagate signals of the mode of communication, in accordance with one or more embodiments. For purposes of brevity, description of like elements and/or processes employed in other embodiments is omitted.

At 702, method 700 can include receiving a request from access point equipment to establish a communications session between the access point equipment and a user equipment. At 704, method 700 can include identifying a reflective surface to facilitate a connection between the user equipment and the access point equipment using a mode of communication of a group of modes of communication, with, in some implementations, this operation resulting in reflected path information corresponding to a reflected path usable by the mode of communication for the communications session.

At 706, method 700 can include in response to the request, communicating to the access point equipment, mode information corresponding to the mode of communication and the reflected path information.

Additional or alternative elements of some embodiments can further include, based on a characteristic of the connection to be facilitated, selecting, by the routing controller equipment, the mode of communication from the group of modes.

Additional or alternative elements of some embodiments can include communication via an encoded wave in accordance with the mode of communication, with the identifying of the reflective surface including identifying that the reflective surface is a reflective surface usable to reflect the encoded wave. In some or all of these implementations, the user equipment can include a receiver to facilitate receipt of the encoded wave received in accordance with the reflected path. Example modes of communication can include, but are not limited to, communication by a signal encoded in a beam of light, communication by a signal encoded in a wave of sound, and communication via a signal encoded in radiated thermal energy.

Additional or alternative operations that can be performed by one or more embodiments can include testing, by the routing controller equipment, for an adverse effect associated with the mode of communication being directed in accordance with the reflected path. Example adverse effects can include physical damage to an entity or object.

Additional or alternative embodiments can include identifying a response signal received from the user equipment based on the first mode of communication and the reflected path, with in some examples, this response signal being communicated by a different mode of communication from the first mode of communication.

Additional or alternative elements of some embodiments can include, based on the request, identifying, by the routing controller equipment, a first geographic location of the access point equipment and a second geographic location of the user equipment, with the identifying of the reflective surface being based on the first geographic location and the second geographic location.

Additional or alternative embodiments can include features whereby the reflected path information includes transmission strength information representative of a transmission signal strength to be used by the access point equipment for using with the mode of communication to facilitate the connection using the reflective surface.

In additional or alternative embodiments, before receiving the request operation, embodiments can identify an idle location of the user equipment in an idle state, and based on the idle location, mapping, by the routing controller equipment, respective potential reflective paths to the user equipment by ones of the group of modes, wherein identifying the reflective path based on the request comprises selecting the reflective path from the respective potential reflective paths.

In additional or alternative embodiments, the operations can further include, before receiving the request, identifying, by the routing controller equipment, a group of reflective surfaces usable by the mode of communication, with the identifying of the reflective path being based on the group of reflective surfaces.

Figure 8:
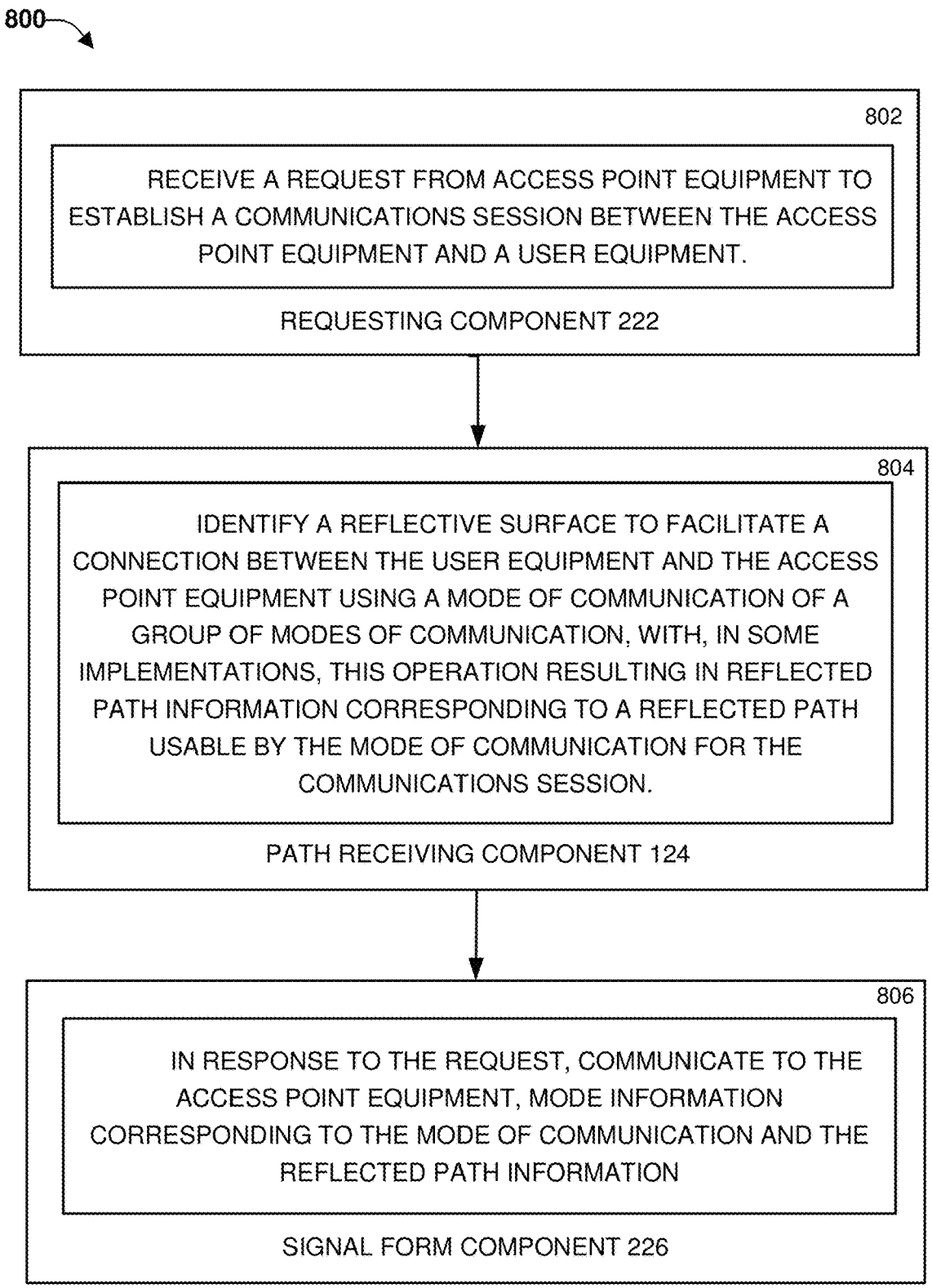
FIG. 8 depicts a system that can facilitate, based on different modes of communication, using a selected reflective surface to reflect a signal of a particular mode of communication, from access point equipment to signal receiving equipment, in accordance with one or more embodiments.

FIG. 8 depicts a system 800 that can facilitate, based on different modes of communication, using a selected reflective surface to reflect a signal of a particular mode of communication, from access point equipment to signal receiving equipment, in accordance with one or more embodiments. For purposes of brevity, description of like elements and/or processes employed in other embodiments is omitted. As depicted system 800 can include, as described with FIG. 2, a network device (e.g., access point equipment 170) having a processor and a memory that can stores executable instructions that, when executed by the processor, facilitate performance of operations, by components including, but not limited to requesting component 222, path receiving component 224, signal form component 226, and other components described or suggested by different embodiments described herein, that can improve the operation of system 800.

In a non-limiting example, component 802 can include the functions of request receiving component 222, supported by the other layers of system 800. For example, component 802 can request, from a different network device (e.g., route controller equipment 150), a path for a connection to yet another network device (e.g., destination device 175), with the path including, for example, a form of signal of the connection and a location of a surface usable to alter a direction (e.g., reflect) of the form of signal.

In this and other examples, component 804 can include the functions of path receiving component 224, supported by the other layers of system 800. Continuing this example, in one or more embodiments, component 804 can receive from the routing controller equipment 150, the path to destination device 175.

In additional examples, component 806 can include signal form component 226, supported by the other layers of system 800. With this component, system 800 can facilitate the connection being established with destination device 175 via the path and communicating a signal of the form of signal toward the surface, e.g., by surface 185.

In an alternative implementation of embodiments, instead of a connection being established between access point equipment 170 and destination device 175, the connection established can be a backhaul connection that links an edge network device with a core network device.

In one or more embodiments, the form of signal can include a type of electromagnetic wave, and the surface can have been selected based on a property of the surface, e.g., that the surface can reflect the type of electromagnetic wave. Additional features can include destination device 175 or backhaul equipment (not shown) can include receiver that provides a capability of receiving the type of electromagnetic wave reflected by the surface. In an implementation example, the form of signal was selected for the path based on destination device 175 the capability to receive the type of electromagnetic utilized.

Figure 9:
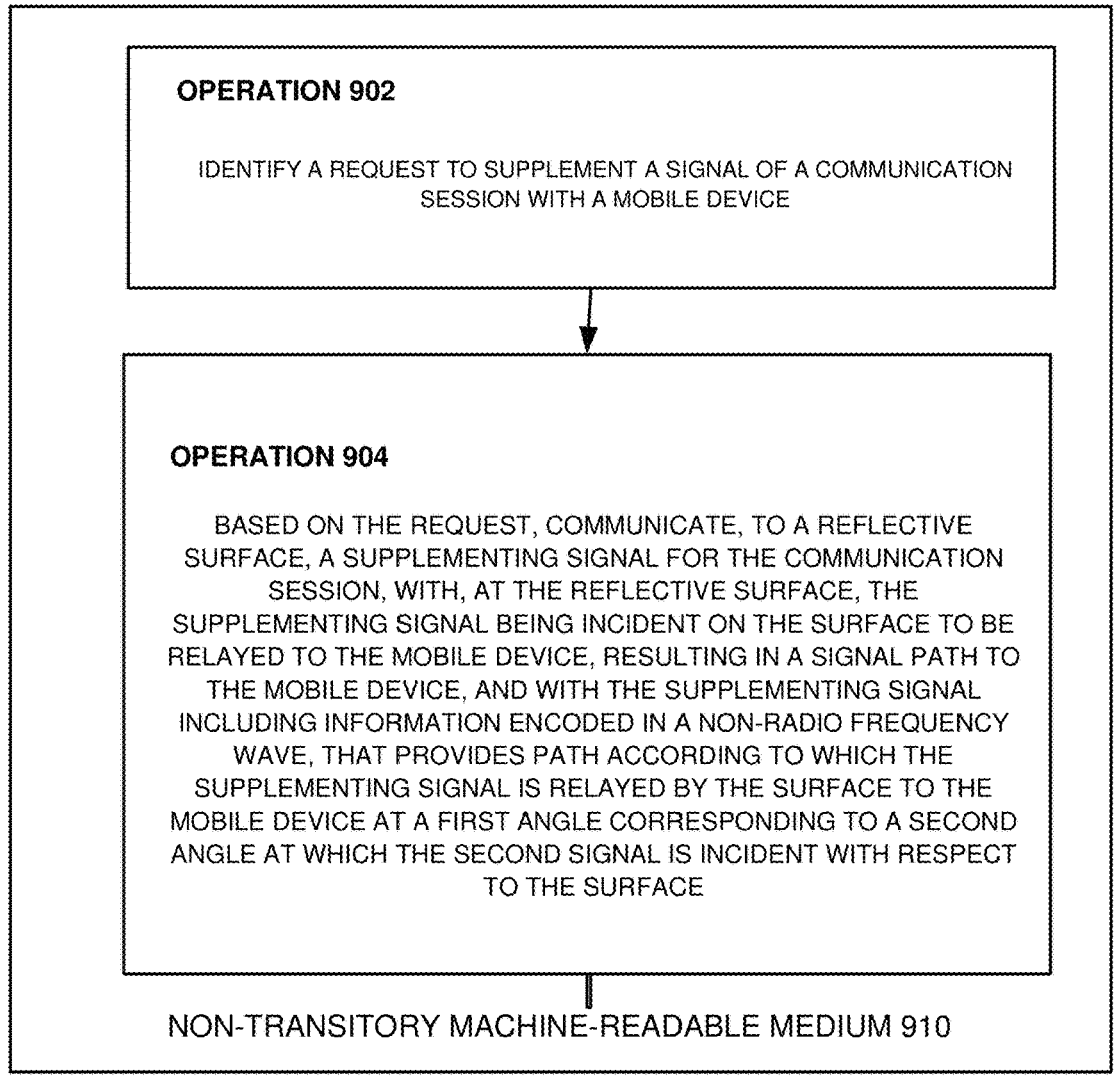
FIG. 9 depicts an example non-transitory machine-readable medium 910 that can include executable instructions that, when executed by a processor of a system, facilitate using a selected reflective surface to reflect a signal of a particular mode of communication, from access point equipment to signal receiving equipment, in accordance with one or more embodiments described above.

FIG. 9 depicts an example 900 non-transitory machine-readable medium 910 that can include executable instructions that, when executed by a processor of a system, facilitate using a selected reflective surface to reflect a signal of a particular mode of communication, from access point equipment to signal receiving equipment, in accordance with one or more embodiments described above. For purposes of brevity, description of like elements and/or processes employed in other embodiments is omitted. As depicted, non-transitory machine-readable medium 910 includes executable instructions that can facilitate performance of operations 902-904.

In one or more embodiments, the operations can include operation 902 that can identify a request to supplement a signal of a communication session with a mobile device. Further operation 904 can include an instruction to, based on the request, communicate, to a reflective surface, a supplementing signal for the communication session, with, at the reflective surface, the supplementing signal being incident on the surface to be relayed to the mobile device, resulting in a signal path to the mobile device, and with the supplementing signal including information encoded in a non-radio frequency wave, that provides path according to which the supplementing signal is relayed by the surface to the mobile device at a first angle corresponding to a second angle at which the second signal is incident with respect to the surface.

In additional or alternative embodiments, the non-radio frequency wave was selected based on an atmospheric condition of the air between the base station and the mobile device.

In additional or alternative embodiments, the signal path can be a path according to which the second signal is relayed by the surface to the mobile device at a first angle corresponding to a second angle at which the second signal is incident with respect to the surface.

Figure 10:
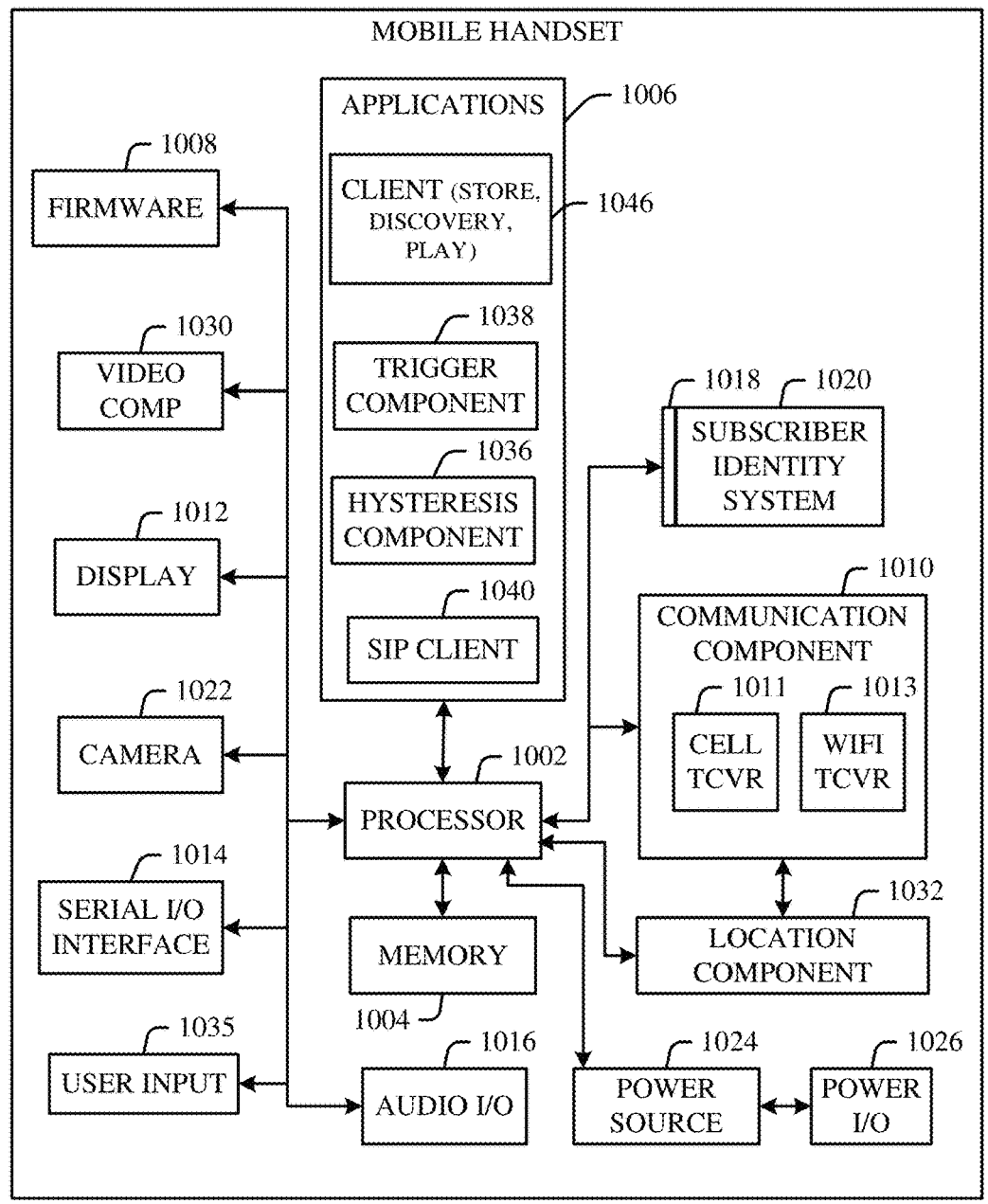
FIG. 10 illustrates an example block diagram of an example mobile handset operable to engage in a system architecture that can facilitate processes described herein, in accordance with one or more embodiments.

FIG. 10 illustrates an example block diagram of an example mobile handset 1000 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1002 for controlling and processing all onboard operations and functions. A memory 1004 interfaces to the processor 1002 for storage of data and one or more applications 1006 (e.g., a video player software, user feedback component software, etc.). Other applications can include voice recognition of predetermined voice commands that facilitate initiation of the user feedback signals. The applications 1006 can be stored in the memory 1004 and/or in a firmware 1008, and executed by the processor 1002 from either or both the memory 1004 or/and the firmware 1008. The firmware 1008 can also store startup code for execution in initializing the handset 1000. A communications component 1010 interfaces to the processor 1002 to facilitate wired/wireless communication with external systems, e.g., cellular networks, VoIP networks, and so on. Here, the communications component 1010 can also include a suitable cellular transceiver 1011 (e.g., a GSM transceiver) and/or an unlicensed transceiver 1013 (e.g., Wi-Fi, WiMax) for corresponding signal communications. The handset 1000 can be a device such as a cellular telephone, a PDA with mobile communications capabilities, and messaging-centric devices. The communications component 1010 also facilitates communications reception from terrestrial radio networks (e.g., broadcast), digital satellite radio networks, and Internet-based radio services networks The handset 1000 includes a display 1012 for displaying text, images, video, telephony functions (e.g., a Caller ID function), setup functions, and for user input. For example, the display 1012 can also be referred to as a "screen" that can accommodate the presentation of multimedia content (e.g., music metadata, messages, wallpaper, graphics, etc.). The display 1012 can also display videos and can facilitate the generation, editing and sharing of video quotes. A serial I/O interface 1014 is provided in communication with the processor 1002 to facilitate wired and/or wireless serial communications (e.g., USB, and/or IEEE 1294) through a hardwire connection, and other serial input devices (e.g., a keyboard, keypad, and mouse). This supports updating and troubleshooting the handset 1000, for example. Audio capabilities are provided with an audio I/O component 1016, which can include a speaker for the output of audio signals related to, for example, indication that the user pressed the proper key or key combination to initiate the user feedback signal. The audio I/O component 1016 also facilitates the input of audio signals through a microphone to record data and/or telephony voice data, and for inputting voice signals for telephone conversations.

The handset 1000 can include a slot interface 1018 for accommodating a SIC (Subscriber Identity Component) in the form factor of a card SIM or universal SIM 1020, and interfacing the SIM card 1020 with the processor 1002. However, it is to be appreciated that the SIM card 1020 can be manufactured into the handset 1000, and updated by downloading data and software.

The handset 1000 can process IP data traffic through the communications component 1010 to accommodate IP traffic from an IP network such as, for example, the Internet, a corporate intranet, a home network, a person area network, etc., through an ISP or broadband cable provider. Thus, VOIP traffic can be utilized by the handset 1000 and IP-based multimedia content can be received in either an encoded or a decoded format.

A video processing component 1022 (e.g., a camera) can be provided for decoding encoded multimedia content. The video processing component 1022 can aid in facilitating the generation, editing, and sharing of video quotes. The handset 1000 also includes a power source 1024 in the form of batteries and/or an AC power subsystem, which power source 1024 can interface to an external power system or charging equipment (not shown) by a power I/O component 1026.

The handset 1000 can also include a video component 1030 for processing video content received and, for recording and transmitting video content. For example, the video component 1030 can facilitate the generation, editing and sharing of video quotes. A location tracking component 1032 facilitates geographically locating the handset 1000. As described hereinabove, this can occur when the user initiates the feedback signal automatically or manually. A user input component 1034 facilitates the user initiating the quality feedback signal. The user input component 1034 can also facilitate the generation, editing and sharing of video quotes. The user input component 1034 can include such conventional input device technologies such as a keypad, keyboard, mouse, stylus pen, and/or touch screen, for example.

Referring again to the applications 1006, a hysteresis component 1036 facilitates the analysis and processing of hysteresis data, which is utilized to determine when to associate with the access point. A software trigger component 1038 can be provided that facilitates triggering of the hysteresis component 1036 when the Wi-Fi transceiver 1013 detects the beacon of the access point. A SIP client 1040 enables the handset 1000 to support SIP protocols and register the subscriber with the SIP registrar server. The applications 1006 can also include a client 1042 that provides at least the capability of discovery, play and store of multimedia content, for example, music.

The handset 1000, as indicated above related to the communications component 1010, includes an indoor network radio transceiver 1013 (e.g., Wi-Fi transceiver). This function supports the indoor radio link, such as IEEE 802.11, for the dual-mode GSM handset 1000. The handset 1000 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G NR systems, one or more embodiments discussed herein can be applicable to any RAT or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mm Wave frequencies also allows more antennas to be packed in the same physical dimension, which allows for large-scale spatial multiplexing and highly directional beamforming.

Figure 11:
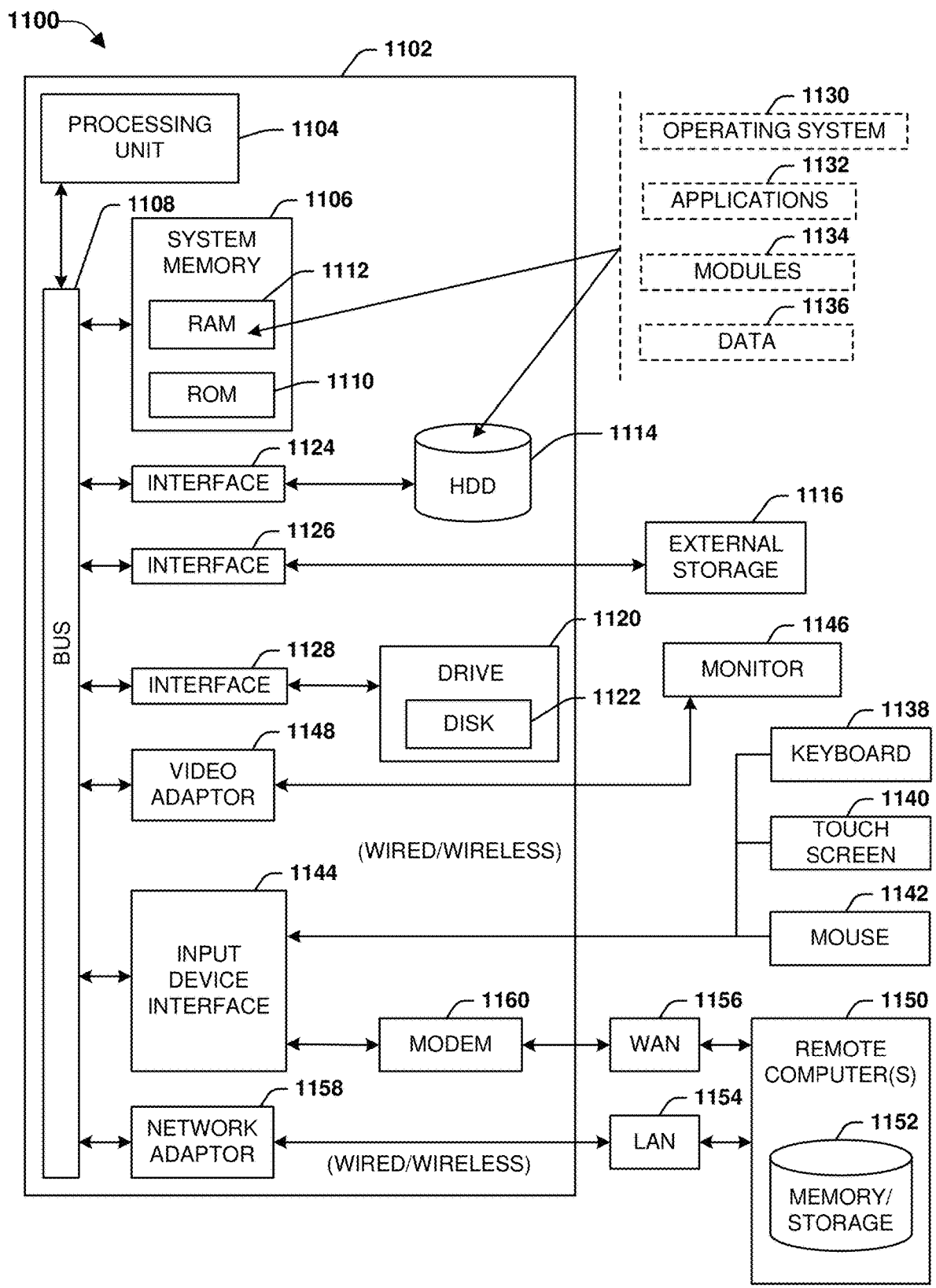
FIG. 11 illustrates an example block diagram of an example computer operable to engage in a system architecture that can facilitate processes described herein, in accordance with one or more embodiments.

FIG. 11 provides additional context for various embodiments described herein, intended to provide a brief, general description of a suitable operating environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example operating environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1111 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and a drive 1120, e.g., such as a solid-state drive, an optical disk drive, which can read or write from a disk 1122, such as a CD-ROM disc, a DVD, a BD, etc. Alternatively, where a solid-state drive is involved, disk 1122 would not be included, unless separate. While the internal HDD 1114 is illustrated as located within the computer 1102, the internal HDD 1114 can also be configured for external use in a suitable chassis (not shown). Additionally, while not shown in environment 1100, a solid-state drive (SSD) could be used in addition to, or in place of, an HDD 1114. The HDD 1114, external storage device(s) 1116 and drive 1120 can be connected to the system bus 1108 by an HDD interface 1124, an external storage interface 1126 and a drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above, such as but not limited to a network virtual machine providing one or more aspects of storage or processing of information. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine-readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider, but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

What is claimed is:

1. A device, comprising:
a processing system including a processor; and
a memory that stores executable instructions that, when executed by the processor, facilitate performance of operations, comprising:
receiving a request from access point equipment to establish a communication session between the access point equipment and a user equipment;
determining a connection issue between the access point equipment and the user equipment resulting in a determination;
based on the determination, identifying a reflective surface from a group of reflective surfaces to facilitate a connection between the user equipment and the access point equipment resulting in reflected path information corresponding to a reflected path; and
in response to the request, communicating to the access point equipment, the reflected path information to facilitate the communication session between the access point equipment and the user equipment along the reflected path.

2. The device of claim 1, wherein the identifying of the reflective surface comprises identifying a mode of communication from a group of modes of communication, wherein the communicating to the access point equipment comprises communicating mode of communication.

3. The device of claim 2, wherein the operations comprise selecting the mode of communication from the group of modes of communication based on a characteristic of the connection.

4. The device of claim 2, wherein the group of modes of communication comprises communication by a signal encoded in at least one of a beam of light, wave of sound, radiated thermal energy, or a combination thereof resulting in an encoded wave.

5. The device of claim 4, wherein the identifying of the reflective surface comprises identifying the reflective surface usable by the encoded wave.

6. The device of claim 4, wherein the user equipment comprises a receiver to facilitate receipt of the encoded wave received in accordance with the reflected path.

7. The device of claim 1, wherein the operations comprise testing for an adverse affect effect associated with the reflected path.

8. The device of claim 7, wherein the adverse affect effect comprises physical damage to an entity or object.

9. The device of claim 1, wherein the operations comprise identifying a first geographic location of the access point equipment and a second geographic location of the user equipment, wherein identifying the reflective surface comprises identifying the reflective surface based on the first geographic location and the second geographic location.

10. The device of claim 1, wherein the reflected path information comprises transmission strength information representative of a transmission signal strength to be used by the access point equipment to facilitate the connection using the reflective surface.

11. A non-transitory machine-readable medium, comprising executable instructions that, when executed by a processing system including a processor, facilitate performance of operations, comprising:

selecting a mode of communication from a group of modes of communication based on a characteristic of a connection;

receiving a request from access point equipment to establish a communication session between the access point equipment and a user equipment along the connection;

determining a connection issue between the access point equipment and the user equipment resulting in a determination;

based on the determination, identifying a reflective surface from a group of reflective surfaces to facilitate a connection between the user equipment and the access point equipment resulting in reflected path information corresponding to a reflected path; and in response to the request, communicating to the access point equipment, the reflected path information to facilitate the communication session between the access point equipment and the user equipment along the reflected path utilizing the mode of communication.

12. The non-transitory machine-readable medium of claim 11, wherein the group of modes of communication comprises communication by a signal encoded in at least one of a beam of light, wave of sound, radiated thermal energy, or a combination thereof resulting in an encoded wave.

13. The non-transitory machine-readable medium of claim 12, wherein the identifying of the reflective surface comprises identifying the reflective surface usable by the encoded wave.

14. The non-transitory machine-readable medium of claim 12, wherein the user equipment comprises a receiver to facilitate receipt of the encoded wave received in accordance with the reflected path.

15. The non-transitory machine-readable medium of claim 11, wherein the operations comprise testing for an adverse effect associated with the reflected path.

16. The non-transitory machine-readable medium of claim 15, wherein the adverse effect comprises physical damage to an entity or object.

17. The non-transitory machine-readable medium of claim 11, wherein the operations comprise identifying a first geographic location of the access point equipment and a second geographic location of the user equipment, wherein identifying the reflective surface comprises identifying the reflective surface based on the first geographic location and the second geographic location.

18. The non-transitory machine-readable medium of claim 11, wherein the reflected path information comprises transmission strength information representative of a transmission signal strength to be used by the access point equipment to facilitate the connection using the reflective surface.

19. A method, comprising:
receiving, by a processing system including a processor, a request from access point equipment to establish a communication session between the access point equipment and a user equipment along a connection;

determining, by the processing system, a connection issue between the access point equipment and the user equipment resulting in a first determination;

determining, by the processing system, transmission strength information to be used by the access point equipment to facilitate the connection resulting in a second determination;

based on the first determination and the second determination, identifying, by the processing system, a reflective surface from a group of reflective surfaces to facilitate a connection between the user equipment and the access point equipment resulting in reflected path information corresponding to a reflected path; and in response to the request, communicating, by the processing system, to the access point equipment, the reflected path information to facilitate the communication session between the access point equipment and the user equipment along the reflected path.

20. The method of claim 19, comprising identifying a first geographic location of the access point equipment and a second geographic location of the user equipment, wherein identifying the reflective surface comprises identifying the reflective surface based on the first geographic location and the second geographic location.

* * * * *